United States Patent Office 3,299,131
Patented Jan. 17, 1967

3,299,131
GLYOXANILIDE THIOSEMICARBAZONES
Milton Wolf and Joseph Lester Szabo, West Chester, and James L. Diebold, Havertown, Pa., assignors to American Home Products Corporation, New York, N.Y., a corporation of Delaware
No Drawing. Filed Aug. 13, 1965, Ser. No. 479,648
9 Claims. (Cl. 260—552)

This invention relates to new and useful thiosemicarbazone derivatives as well as to a novel method for their preparation. In particular, the present invention is concerned with substituted-glyoxanilide-4-substituted thiosemicarbazones having therapeutic activity.

The novel compounds which are included within the scope of this invention are represented by the following formula:

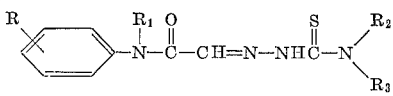

wherein R is selected from the group consisting of hydrogen, cyano, nitro, trifluoromethyl, halo, lower alkyl, lower alkoxy, phenyl, piperidyl, benzyl, phenoxy, phenthio, phenimido, phensulfuryl, and $(R_4)_2NCO$— and $(R_4)_2NSO_2$— wherein $R_4$ is selected from the group consisting of hydrogen and lower alkyl; $R_1$ is selected from the group consisting of hydrogen and lower alkyl; $R_2$ is selected from the group consisting of hydrogen, lower alkyl and lower alkenyl, and $R_3$ is selected from the group consisting of hydrogen, lower alkyl, lower alkenyl, phenyl, halophenyl, (lower) alkylphenyl, benzyl, piperidyl, furyl and furfuryl. Specific examples of such compounds include: 3'-chloroglyoxanilide thiosemicarbazone; 4'-methoxy-N-methylglyoxanilide thiosemicarbazone and 3',4',5'-trimethoxyglyoxanilide-4,4-dimethylthiosemicarbazone. Alternatively, the nomenclature employed in naming the compounds of this invention may designate that the thio group is attached to the three (3) position of the semicarbazone moiety and that semicarbazone moiety is, in turn, affixed to the two (2) position of the glyoxanilide portion of the molecule. Employing this alternative nomenclature, the aforesaid compounds would be named as follows: 3'-chloroglyoxanilide 2-(3-thiosemicarbazone); 4'-methoxy - N - methylglyoxanilide 2-(3-thiosemicarbazone) and 3',4',5'-trimethoxyglyoxanilide 2-(4,4-dimethyl-3-thiosemicarbazone).

In accord with the process aspects of the present invention, the compounds of this invention may be prepared by the reaction of a glyoxanilide oxime of the formula:

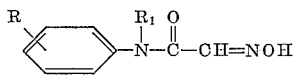

where R and $R_1$ have the same meaning as previously defined with a thiosemicarbazide of the formula:

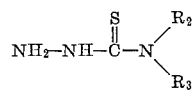

where $R_2$ and $R_3$ are as previously set forth. The reaction is effected by heating a substantially equimolar mixture of the reactants in an acidified, polar reaction-inert solvent at a temperature from about 30° C. to about 100° C. for a period of from about five minutes to about four hours. Preferably, this reaction is conducted in an acidified, water-ethanol mixture at the reflux temperature of the reaction mixture for a period of ten to thirty minutes. After the reaction is complete, the reaction mixture is cooled, filtered, washed and dried. Thereafter, the product may be recrystallized from a suitable solvent, such as alkanol, to obtain a pure crystalline product.

By reaction-inert solvent as employed herein is meant a polar solvent or solvent mixture which dissolves the reactants but will not prevent or interfere with their interaction. Acids which may be employed to acidify the reaction mixture of the process of this invention are those that will produce a hydronium ion when solvated in the aforementioned reaction-inert solvent. Examples of such acids are: hydrochloric, hydrobromic, hydroiodic, nitric, sulfuric, and phosphoric acid. Many of the reactants employed in the process of this invention are known compounds which are readily available from commercial sources. Others which are not commercially available can easily be prepared in accordance with standard organic procedures well known to those skilled in the art. A procedure which has been employed to synthesize the glyoxanilide oximes utilized in the process of the present invention is described by Sandmeyer in Helv. Chim. Acta, 2, 234 (1919).

In accord with the present invention, the aforementioned glyoxanilide thiosemicarbazones have been found to possess interesting pharmaceutical properties which render them useful as synthetic medicinals. More particularly, these compounds exhibit utility as potent antiviral, anti-tubercular and anti-inflammatory agents.

When the compounds of this invention are employed as antiviral, anti-tubercular and anti-inflammatory agents, they may be administered alone or in combination with pharmaceutically acceptable carriers, the proportion of which is determined by the solubility and chemical nature of the compound, chosen route of administration and standard pharmaceutical practice. For example, they may be administered orally in the form of tablets or capsules containing such excipients as starch, milk sugar, certain types of clay and so forth. They may be administered sublingually in the form of troches or lozenges in which the active ingredient is mixed with sugar and corn syrups, flavoring agents and dyes; and then dehydrated sufficiently to make it suitable for pressing into a solid form. They may be administered orally in the form of solutions which may contain coloring and flavoring agents or they may be injected parenterally, that is intramuscularly, intravenously or subcutaneously. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects and preferably at a level that is in the range of from about 5 mg. to about 50 mg. per kg. of body weight per day, although as aforementioned variations will occur. However, a dosage level that is in the range of from about 10 mg. to about 35 mg. per kg. of body weight per day is most desirably employed in order to achieve effective results.

The following examples are given by way of illustration and are not to be construed as limitations of this in-

Example I

A solution containing 1.82 g. of thiosemicarbazide in 30 ml. of distilled water containing 4.0 ml. of hydrochloric acid is added to a warm ethanolic solution containing 3.97 g. of 3'-chloroglyoxanilide oxime. The resulting clear solution is refluxed for fifteen minutes. In about two minutes, the product separates as a straw-colored solid and the cooled reaction mixture is filtered, washed with water, dried at 50° C. under house vacuum, yield 5.10 g. (99.2 percent), M.P. 185–95° C., dec. (uncorr.). The crude product is recrystallized from ethanol-water (Darco G 60) affording pale yellow prisms of 3'-chloroglyoxanilide thiosemicarbazone (3.50 g., 68.1 percent), M.P. 210.5° C., dec. (uncorr.).

Analysis.—Calc'd. for $C_9H_9ClN_4OS$: C, 42.10; H, 3.53; Cl, 13.81; S, 12.49. Found: C, 42.39; H, 3.38; Cl, 13.88; S, 12.5.

In a similar manner, 3',4'-dichloroglyoxanilide thiosemicarbazone and 4'-bromoglyoxanilide thiosemicarbazone are produced.

Example II

A solution of 4,4-dimethyl thiosemicarbazide (3.0 g.) in distilled water (75 ml.) containing 5 N hydrobromic acid (5.0 ml.) is added to a warm solution of 4-methyl-N-ethyl glyoxanilide oxime (8.0 g.) in absolute ethanol and the mixture is refluxed for thirty minutes. After the reaction mixture is cooled, the product is separated by filtration, washed with water, dried under vacuum and recrystallized from ethanol-water. In this way, 4'-methyl-N-ethylglyoxanilide-4,4-dimethylthiosemicarbazone is obtained.

Similarly by reacting the appropriate thiosemicarbazide and glyoxanilide oxime, the following compounds are synthesized:

4'-cyano-N-methylglyoxanilide-4-prolylthiosemicarbazone
2'-nitro-N-methylglyoxanilide-4,4-diethylthiosemicarbazone
3'-methoxy-N-butylglyoxanilide-4-pentylthiosemicarbazone
3'-fluoro-N-ethylglyoxanilide thiosemicarbazone
N-hexylglyoxanilide-4-allylthiosemicarbazone

Example III

When 4'-methoxyglyoxanilide oxime (9.71 g., 0.050 m.) is reacted with thiosemicarbazide (4.56 g., 0.050 m.) in a manner similar to that of Example II (reflux time, 0.5 hour), 4'-methoxyglyoxanilide thiosemicarbazone is produced as yellow needles (12.4 g., 98.3 percent), M.P. 192.3° C. dec. (uncorr.). Recrystallization of the crude product from 2-propanol gives yellow needles (8.4 g., 66.6 percent), M.P. 203.5° C. dec. (uncorr.).

Analysis.—Calc'd. for $C_{10}H_{12}N_4O_2S$: C, 47.60; H, 4.79; N, 22.21. Found: C, 47.52; H, 4.62; N, 21.98.

In a similar manner, 2'-ethoxyglyoxanilide thiosemicarbazone and 4' - butoxyglyoxanilide-4-phenylthiosemicarbazone are synthesized.

Example IV

A solution of thiosemicarbazide (4.56 g., 0.050 m.) in distilled water (30 ml.) containing 6 N hydrochloric acid (4.0 ml.) is added to a warm solution of glyoxanilide oxime (8.21 g., 0.050 m.) in absolute ethanol. The resulting mixture is refluxed for 30 minutes. After about five minutes, the product separates as a straw-colored solid. Thereafter, the cooled reaction mixture is filtered, and the product washed with water, and dried under vacuum, to yield 8.9 g. (80.2 percent) M.P. 210° C. dec. (uncorr.). Recrystallization of the crude product from ethanol yields pale yellow rectangular plates of glyoxanilide thiosemicarbazone (7.90 g., 71.2 percent), M.P. 210° C. dec. (uncorr.).

Analysis.—Calc'd. for $C_9H_{10}N_4OS$: C, 48.63; H, 4.53; N, 25.21; S, 14.42. Found: C, 48.88; H, 4.44; N, 25.02; S, 13.9.

Example V

When an acidified 0.05 m. aqueous solution of a thiosemicarbazide is admixed with a 0.50 m. ethanol solution of an appropriate glyoxanilide oxime and the resulting mixture is refluxed for approximately 30 minutes, the corresponding glyoxanilide thiosemicarbazone will be produced. Thereafter, the product may be separated by filtration and recrystallized.

Utilizing the aforesaid procedure the following compounds are produced:

4'-trifluoromethyl-N-methylglyoxanilide-4-(3-butenyl)-thiosemicarbazone.
3'-iodoglyoxanilide-4,4-divinylthiosemicarbazone.
Glyoxanilide-4-(p-chlorophenyl)-thiosemicarbazone.
4'-propyl-N-ethylglyoxanilide-4-(p-tolyl)-thiosemicarbazone.
4'-phenoxyglyoxanilide-4-(p-bromophenyl)-thiosemicarbazone.
3'-carbamylglyoxanilide-4-piperidylthiosemicarbazone.
4'-pentyl-N-methylglyoxanilide-4-butylthiosemicarbazone.
5'-heptylglyoxanilide-4-methylthiosemicarbazone.
4'-benzylglyoxanilide-4-(p-propylphenyl)-thiosemicarbazone.
4'-phensulfurylglyoxanilide thiosemicarbazone.
4'-phenthioglyoxanilide-4,4-dimethylthiosemicarbazone.

Example VI

A solution of thiosemicarbazide (2.01 g., 0.022 m.) in distilled water (30 ml.) containing 6 N hydrochloric acid (4.0 ml.) is added to a warm solution of 4'-trifluoromethylglyoxanilide oxime (5.00 g., 0.215 m.) in absolute ethanol. The resulting clear solution is refluxed for 15 minutes and the product separates as a colorless solid. The cooled reaction mixture is filtered, and the product washed with water, dried under house vacuum; yield 5.30 g. (85.0 percent), M.P. 217.0° dec. (uncorr.). The crude product is recrystallized from 2-propanol and then from absolute ethanol giving colorless rods of 4'-trifluoromethylglyoxanilide thiosemicarbazone (1.60 g., 25.7 percent) M.P. 223.5° C. dec. (uncorr.); second crop (0.50 g., 8.0 percent) M.P. 223° C. dec. (uncorr.).

Analysis.—Calc'd. for $C_{10}H_9F_3N_4OS$: C, 41.37; H, 3.13; N, 19.30; S, 11.05. Found: C, 41.63; H, 3.48; N, 19.24; S, 11.0.

Example VII

To a solution of chloral hydrate (44.7 g., 0.27 m.) in distilled water (600 cc.) is added successively: sodium sulfate decahydrate (650 g.), a suspension of 3,4,5-trimethoxyaniline (45.8 g., 0.25 m.) in distilled water (150 cc.) containing concentrated hydrochloric acid (22 cc.), a solution of hydroxylamine hydrochloride (55.0 g., 0.79 m.) in distilled water (250 cc.). The mixture is gradually heated to reflux (ca. 40–45 minutes) then refluxed for two minutes, cooled an an ice bath. The dark mixture is saturated with solid sodium chloride and extracted with methylene chloride (4 x 400 ml.). The combined extracts are washed with saturated salt solution, filtered through anhydrous sodium sulfate, and the amber filtrate concentrated in vacuo. The residual amber oil is taken up in boiling benzene and decolorized with charcoal. On cooling, the product separates as an amber solid (11.2 g., 17.5 percent), M.P. 130–140° C. (uncorr.). The crude product is recrystallized from toluene (Darco G 60) affording pale yellow needles of 3',4',5'-trimethoxyglyoxanilide oxime (7.7 g., 12.1 percent), M.P. 131–4° C. (uncorr.).

A solution of thiosemicarbazide (1.37 g., 0.015 m.) in distilled water (30 ml.) acidified with 2 N hydrochloric acid is added to an ethanolic solution of the above prepared 3',4',5'-trimethoxyglyoxanilide oxime (3.81 g., 0.015 m.). The mixture is refluxed for 2 hours and the product is separated by filtration. Subsequently, the crystalline product is dried and recrystallized from absolute ethanol. In this manner, 3',4',5'-trimethoxyglyoxanilide thiosemicarbazone is obtained.

In a similar manner, 3',4',5'-trimethoxyglyoxanilide-4-benzylthiosemicarbazone and 3',4',5'-trimethoxy-N-methylglyoxanilide-4,4-diethylthiosemicarbazone are produced.

*Example VIII*

When the general procedure of the prior examples is followed employing the hereinafter listed starting compounds, the following corresponding products are obtained:

| Starting compounds | Product |
| --- | --- |
| 4-(p-iodophenyl)-3-thiosemicarbazide and 4-sulfamylglyoxanilide oxime. | 4'-sulfamylglyoxanilide-4-(p-iodophenyl)-thiosemicarbazone. |
| Thiosemicarbazide and 4-piperidylglyoxanilide oxime. | 4'-piperidylglyoxanilide thiosemicarbazone. |
| 4-(2-furyl)-3-thiosemicarbazide and N-methylglyoxanilide oxime. | N-methylglyoxanilide-4-(2-furyl)-thiosemicarbazone. |
| 4,4-dimethyl-3-thiosemicarbazide and 4-phenimidoglyoxanilide oxime. | 4'-phenimidoglyoxanilide-4,4-dimethyl-thiosemicarbazone. |
| 4-(3-allyl)-3-thiosemicarbazide and 4-(N',N'-dimethylsulfamyl)-N-ethylglyoxanilide oxime. | 4'-(N',N'-dimethylsulfamyl)-N-ethylglyoxanilide-4-(3-allyl)-thiosemicarbazone. |
| Thiosemicarbazide and 4-(N-methylcarbamyl)glyoxanilide oxime. | 4'-(N-methylcarbamyl)glyoxanilide thiosemicarbazone. |

*Example IX*

A solution containing 6.0 g. of 4-(p-octylphenyl)thiosemicarbazide in 150 ml. of distilled water as acidified with 5 N hydrochloric acid and admixed with 16.0 g. of glyoxanilide oxime in absolute alcohol. The resulting mixture is refluxed for twenty minutes and, thereafter, cooled, filtered and dried. The product obtained in this manner is glyoxanilide-4-(p-octylphenyl)-thiosemicarbazone.

In a similar manner, glyoxanilide-4-furfurylthiosemicarbazone and glyoxanilide-4-(4-pentenyl)-thiosemicarbazone are produced.

*Example X*

A solution containing 1.5 g. of thiosemicarbazide in 30 ml. of distilled water is acidified with 4 N hydrochloric acid and added to 3.2 g. of 4-(N,N-dimethylcarbamyl)-glyoxanilide oxime in absolute ethanol. The mixture is refluxed for 45 minutes and then cooled, filtered and dried. The crude product is recrystallized from ethanol to yield a crystalline 4'-(N,N-dimethylcarbamyl)glyoxanilide thiosemicarbazone product.

In a similar manner, 4'-(N,N-dipropylcarbamyl)glyoxanilide thiosemicarbazone and 4'-(N-ethylcarbamyl)-glyoxanilide thiosemicarbazone are synthesized.

*Example XI*

A solution containing 3.0 g. of thiosemicarbazide in 60 ml. of distilled water is acidified with 2 N hydrochloric acid and added to 1.7 g. of 4-(N,N-diethylsulfamyl)glyoxanilide oxime in absolute ethanol. The mixture is refluxed for 60 minutes and then cooled, filtered and dried. The crude product is recrystallized from ethanol to yield a crystalline 4'-(N,N-diethylsulfamyl)glyoxanilide thiosemicarbazone product.

Similarly, 4'-(N,N-dibutylsulfamyl)glyoxanilide-4-ethylthiosemicarbazone; 4'-(N-propylsulfamyl)-N-methylglyoxanilide-4-propylthiosemicarbazone and 2'-(N-ethylsulfamyl)glyoxanilide thiosemicarbazone are synthesized.

*Example XII*

A solution containing 9.5 g. of thiosemicarbazide in 150 ml. of distilled water is acidified with 6 N hydrochloric acid and added to 7.6 g. of 3,4-dimethoxyglyoxanilide oxime in absolute ethanol. The mixture is refluxed for 45 minutes and then cooled, filtered and dried. The crude product is recrystallized from ethanol to yield crystalline 3',4'-dimethoxyglyoxanilide thiosemicarbazone.

In a similar manner, 3',4'-dimethyl-N-methylglyoxanilide-4,4-dimethylthiosemicarbazone and 2',6'-dichloroglyoxanilide-4-(p-chlorophenyl)-thiosemicarbazone are produced.

What is claimed is:

1. A compound selected from the group consisting of those having the formula:

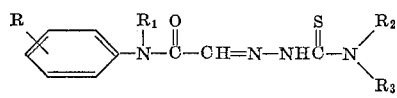

wherein R is selected from the group consisting of hydrogen, cyano, nitro, trifluoromethyl, halo, lower alkyl, lower alkoxy, phenyl, piperidyl, benzyl, phenoxy, phenthio, phenimido, phensulfuryl, and $(R_4)_2NCO—$ and $(R_4)_2NSO—$ wherein $R_4$ is selected from the group consisting of hydrogen and lower alkyl; $R_1$ is selected from the group consisting of hydrogen and lower alkyl; $R_2$ is selected from the group consisting of hydrogen, lower alkyl and lower alkenyl, and $R_3$ is selected from the group consisting of hydrogen, lower alkyl, lower alkenyl, phenyl, halophenyl, (lower)alkylphenyl, benzyl, piperidyl, furyl and furfuryl.

2. 3'-chloroglyoxanilide 2-(3-thiosemicarbazone).
3. 4'-methoxyglyoxanilide 2-(3-thiosemicarbazone).
4. Glyoxanilide 2-(3-thiosemicarbazone).
5. 4' - trifluoromethylglyoxanilide 2 - (3 - thiosemicarbazone).
6. 3',4',5' - trimethoxyglyoxanilide 2 - (3 - thiosemicarbazone).
7. A process for the production of a compound of the formula:

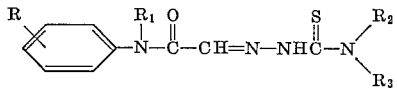

wherein R is selected from the group consisting of hydrogen, cyano, nitro, trifluoromethyl, halo, lower alkyl, lower alkoxy, phenyl, piperidyl, benzyl, phenoxy, phenthio, phenimido, phensulfuryl, and $(R_4)_2NCO—$ and $(R_4)_2NSO—$ wherein $R_4$ is selected from the group consisting of hydrogen and lower alkyl; $R_1$ is selected from the group consisting of hydrogen and lower alkyl; $R_2$ is selected from the group consisting of hydrogen, lower alkyl and lower alkenyl; and $R_3$ is selected from the group consisting of hydrogen, lower alkyl, lower alkene, phenyl, halophenyl, (lower) alkylphenyl, benzyl, piperidyl, furyl and furfuryl, which comprises contacting a compound of the formula:

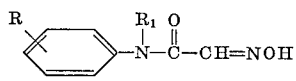

wherein R and $R_1$ are defined as above, with a compound of the formula:

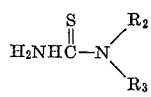

wherein $R_2$ and $R_3$ are defined as above, in an acidified reaction-inert organic solvent at a temperature that is in the range of from about 30° C. to about 100° C. for a period of from about five minutes to about four hours.

8. A process as claimed in claim 7 wherein the reaction-inert organic solvent is a water-ethanol mixture.

9. A process as claimed in claim 8 wherein the reaction mixture is acidified with hydrochloric acid and the reaction is conducted at the reflux temperature of the reaction mixture.

No references cited.

ALEX MAZEL, *Primary Examiner.*

HENRY R. JILES, *Examiner.*

J. H. TURNIPSEED, *Assistant Examiner.*